UNITED STATES PATENT OFFICE.

ADOLPH BAEYER, OF MUNICH, BAVARIA, ASSIGNOR TO THE BADISCHE ANILIN AND SODA FABRIK, OF MANNHEIM, GERMANY.

PREPARATION OF NEW MATERIAL FOR THE MANUFACTURE OF ARTIFICIAL INDIGO.

SPECIFICATION forming part of Letters Patent No. 251,671, dated December 27, 1881.

Application filed September 29, 1881. (Specimens.)

*To all whom it may concern:*

Be it known that I, ADOLPH BAEYER, a subject of the King of Bavaria, residing at Munich, in the Kingdom of Bavaria and Empire of Germany, have invented new and useful Improvements in the Preparation of a New Material for the Manufacture of Artificial Indigo, of which the following is a specification.

This invention relates to the production of orthodinitrodiacetenylphenyl, a substance intended for the manufacture of an artificial indigo-blue.

As an example of the manner in which my invention may be carried into effect I proceed as follows: I mix one part, by weight, of orthonitrophenylpropiolic acid with about one hundred parts of water. I then submit the said mixture to a distillation with steam, whereby the said orthonitrophenylpropiolic acid gets decomposed into carbonic acid and into orthonitroacetenyl benzine. Orthonitroacetenyl benzine mixed in an alcoholic solution with an ammoniacal solution of cuprous chloride is changed into a characteristic copper compound possessing a bright red color. Ten parts, by weight, of this copper compound of orthonitroacetenyl benzine are mixed with a solution containing twenty-five parts, by weight, of red prussiate of potash and from six to seven parts, by weight, of caustic potash, dissolved in one hundred parts of water. I then allow the said mixture to stand during one or two days, or until the red color of the copper compound has disappeared. The precipitate thus obtained is filtered, washed with water, and then repeatedly extracted with alcohol in order to remove any unchanged orthonitroacetenyl benzine. It is then dried and digested with chloroform with application of heat. The solution thus obtained is submitted to distillation, when, after the evaporation of the solvent, dinitrodiacetenylphenyl will be obtained in a solid crystalline condition.

Some characteristic properties of dinitrodiacetenylphenyl thus produced, as above described, are as follows: It is a yellow crystalline solid, fusible at 212° centigrade, insoluble in water, cold alcohol, and ether, sparingly soluble in hot alcohol, bisulphide of carbon, acetone, and benzine, easily soluble in hot nitro-benzine. It is difficultly soluble in concentrated sulphuric acid, but dissolves readily upon the addition of fuming sulphuric acid with an intensely red color and with the production of diisatogen—a new substance, which forms the subject-matter of another application for Letters Patent.

I do not claim as my invention the production of diacetenylphenyl by shaking the copper compound of acetenyl benzine with alcoholic ammonia.

What I claim as new, and desire to secure by Letters Patent, is—

As a new article of manufacture, the orthodinitrodiacetenylphenyl hereinbefore described, and having the characteristics above stated.

In testimony whereof I have hereunto set my hand in the presence of two subscribing witnesses.

ADOLPH BAEYER.

Witnesses:
PAUL FRIEDLAENDER,
LUDVIG LUNDSBERG.